United States Patent
Sugiyama et al.

(10) Patent No.: US 11,726,608 B2
(45) Date of Patent: Aug. 15, 2023

(54) INPUT DETECTION DEVICE, INPUT DETECTION METHOD, AND RECORDING MEDIUM RECORDING INPUT DETECTION PROGRAM

(71) Applicant: SHARP KABUSHIKI KAISHA, Sakai (JP)

(72) Inventors: Koichi Sugiyama, Sakai (JP); Ramadhan Ismail, Sakai (JP); Sachio Tanaka, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/992,939

(22) Filed: Nov. 23, 2022

(65) Prior Publication Data
US 2023/0168767 A1    Jun. 1, 2023

(30) Foreign Application Priority Data

Nov. 29, 2021 (JP) ................................. 2021-192830

(51) Int. Cl.
*G06F 3/041* (2006.01)
(52) U.S. Cl.
CPC ...... *G06F 3/04166* (2019.05); *G06F 3/04186* (2019.05); *G06F 2203/04108* (2013.01)
(58) Field of Classification Search
CPC ............. G06F 3/04166; G06F 3/04186; G06F 2203/04108
See application file for complete search history.

(56) References Cited

U.S. PATENT DOCUMENTS

2017/0344150 A1* 11/2017 Zou ...................... G06F 3/04166
2018/0348950 A1    12/2018 Nakanishi et al.
2020/0104013 A1*  4/2020 He ......................... G06F 3/0447

FOREIGN PATENT DOCUMENTS

JP         2018-206083 A    12/2018

* cited by examiner

*Primary Examiner* — Afroza Chowdhury
(74) *Attorney, Agent, or Firm* — ScienBiziP, P.C.

(57) ABSTRACT

An input detection device includes an input processor inputting a drive signal to an electrode group including a number of electrodes that are arranged adjacent to each other among a plurality of electrodes, and a detection processor detecting an input position based on a detection signal corresponding to the drive signal input to the electrode group. The input processor inputs a first drive signal to a first electrode group including electrodes at a first timing and inputs, at a second timing following the first timing, a second drive signal to a second electrode group including a number of the electrodes included in the first electrode group and at least one electrode positioned adjacent to the first electrode group. The detection processor detects the input position based on a first detection signal corresponding to the first drive signal and a second detection signal corresponding to the second drive signal.

8 Claims, 15 Drawing Sheets

INPUT DETECTION DEVICE, INPUT DETECTION METHOD, AND RECORDING MEDIUM RECORDING INPUT DETECTION PROGRAM

INCORPORATION BY REFERENCE

This application is based upon and claims the benefit of priority from the corresponding Japanese Patent Application No. 2021-192830 filed on Nov. 29, 2021, the entire contents of which are incorporated herein by reference.

BACKGROUND

The present disclosure relates to an input detection device that detects an input position of an inputter on a display panel, an input detection method, and a recording medium recording an input detection program.

In general, a display device that allows an input operation (a screen operation), such as a touch operation and a hover operation, performed on a display screen of a display panel has been used. For example, a display device that forms an electrode block by coupling a plurality of electrodes with each other and that detects an input position of a drive signal input to each electrode block has been used to improve detection sensitivity of a hover operation. Note that the hover operation described above corresponds to a contact-less input operation of performing input in a floating state (a hover state) in which an inputter, such as a finger or a touch pen (a stylus pen, an electronic pen, etc.), is not in contact with the display screen.

However, the general technique detects an input position for each electrode block, resulting in lower resolution compared to a case where an input position is detected for each electrode. Therefore, there arises a problem in that a positional deviation occurs between an original position and a detected position depending on a position of an input operation, that is, position detection accuracy is degraded.

SUMMARY

An object of the present disclosure is to provide an input detection device and an input detection method that improve detection sensitivity of an input operation on a display panel and improve detection accuracy of an input position, and a recording medium recording an input detection program.

According to an aspect of the present disclosure, an input detection device that detects an input position of an inputter on a display panel includes an input processor that inputs a drive signal to an electrode group including a number of electrodes that are arranged adjacent to each other among a plurality of electrodes arranged in parallel on the display panel, and a detection processor that detects the input position based on a detection signal corresponding to the drive signal input to the electrode group. The input processor inputs a first drive signal to a first electrode group including a plurality of electrodes at a first timing and inputs, at a second timing subsequent to the first timing, a second drive signal to a second electrode group including a number of the electrodes included in the first electrode group and at least one electrode positioned adjacent to the first electrode group. The detection processor detects the input position based on a first detection signal corresponding to the first drive signal and a second detection signal corresponding to the second drive signal.

According to another aspect of the present disclosure, an input detection method for detecting an input position of an inputter on a display panel causes at least one processor to execute an input step of inputting a drive signal to an electrode group including a number of electrodes that are arranged adjacent to each other among a plurality of electrodes arranged in parallel on the display panel, and a detection step of detecting the input position based on a detection signal corresponding to the drive signal input to the electrode group. In the input step, a first drive signal is input to a first electrode group including a plurality of electrodes at a first timing and a second drive signal is input to a second electrode group including a number of the electrodes included in the first electrode group and at least one electrode that is adjacent to the first electrode group at a second timing following the first timing. In the detection step, the input position is detected based on a first detection signal corresponding to the first drive signal and a second detection signal corresponding to the second drive signal.

According to a further aspect of the present disclosure, a recording medium records an input detection program for detecting an input position of an inputter on a display panel. The input detection program causes at least one processor to execute an input step of inputting a drive signal to an electrode group including a number of electrodes that are arranged adjacent to each other among a plurality of electrodes arranged in parallel on the display panel, and a detection step of detecting the input position based on a detection signal corresponding to the drive signal input to the electrode group. In the input step, a first drive signal is input to a first electrode group including a plurality of electrodes at a first timing, and a second drive signal is input to a second electrode group including a number of the electrodes included in the first electrode group and at least one electrode that is adjacent to the first electrode group at a second timing following the first timing. In the detection step, the input position is detected based on a first detection signal corresponding to the first drive signal and a second detection signal corresponding to the second drive signal.

According to the present disclosure, there is provided an input detection device and an input detection method that improve detection sensitivity of an input operation on a display panel and improve detection accuracy of an input position, and a recording medium recording an input detection program.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. Note that the following embodiment is merely an example that embodies the present disclosure, and does not intend to limit the technical scope of the present disclosure.

Figure 1:
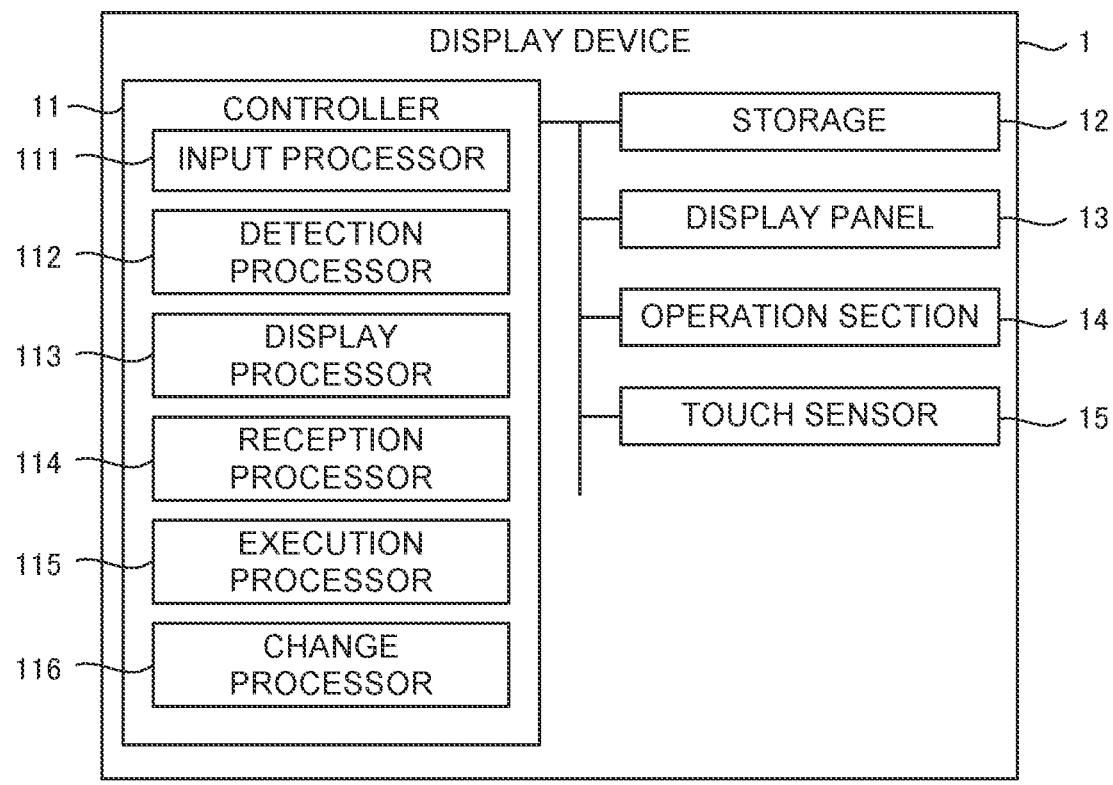
FIG. 1 is a block diagram illustrating a configuration of a display device according to an embodiment of the present disclosure.

As illustrated in FIG. 1, a display device 1 according to the embodiment of the present disclosure includes a controller 11, a storage 12, a display panel 13, an operation section 14, and a touch sensor 15. The display device 1 is an example of an input detection device in the present disclosure. The input detection device of the present disclosure is a device that detects an input position of an inputter (a user's hand, a fingertip, a stylus pen, a support rod, etc.) on the display panel 13.

Figure 2:
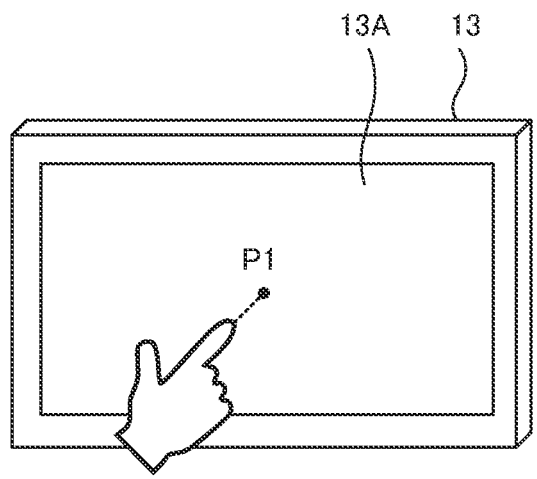
FIG. 2 is a diagram schematically illustrating an example of a hover operation in the display device according to the embodiment of the present disclosure.
Figure 3:
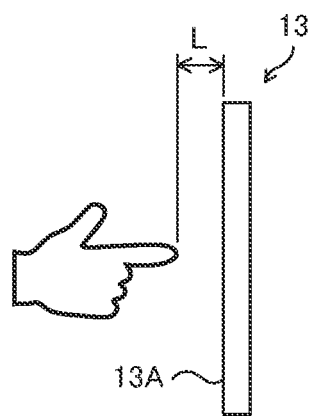
FIG. 3 is a diagram schematically illustrating an example of a hover operation in the display device according to the embodiment of the present disclosure.

The display device 1 employs a capacitive method and accepts a contactless input operation (hereinafter referred to as a hover operation) performed by the user on a display screen 13A. For example, as illustrated in FIGS. 2 and 3, the display device 1 detects, when a finger of a user approaches the display screen 13A and a distance L between the finger and the display screen 13A becomes equal to or smaller than a predetermined distance, the finger so as to detect a hover operation in accordance with a position of the finger. Subsequently, the display device 1 executes an input process corresponding to the hover operation performed by the user on the display screen 13A. For example, when the user performs a hover operation in a predetermined position over the display screen 13A, the display device 1 detects a position on the display screen 13A corresponding to the position of the hover operation and receives a selection operation of selecting a target using an input operation icon P1 displayed on the display screen 13A.

The hover operation corresponds to an operation of fitting the input operation icon P1 (e.g., a cursor) to a specific element by an inputter (e.g., user's hand, a fingertip, a stylus pen, a support rod, etc.) for the display screen 13A, and further corresponds to a state before the inputter is in contact with the display screen 13A (a hover state with the inputter floating in the air). The hover state refers to a state in which a distance between the inputter and the display screen 13A is equal to or smaller than a predetermined distance and the inputter is not in contact with the display screen 13A, that is, a state in which the inputter is positioned close to the display screen 13A.

Note that the display device 1 can receive an input operation by a touch by the user on the display screen 13A (hereinafter referred to as a "touch operation").

The display panel 13 is a display that shows an image, and is a liquid-crystal display, for example. The operation section 14 is an operation device including a mouse and a keyboard, for example. Alternatively, the operation section 14 may be configured by a touch panel.

Figure 4:
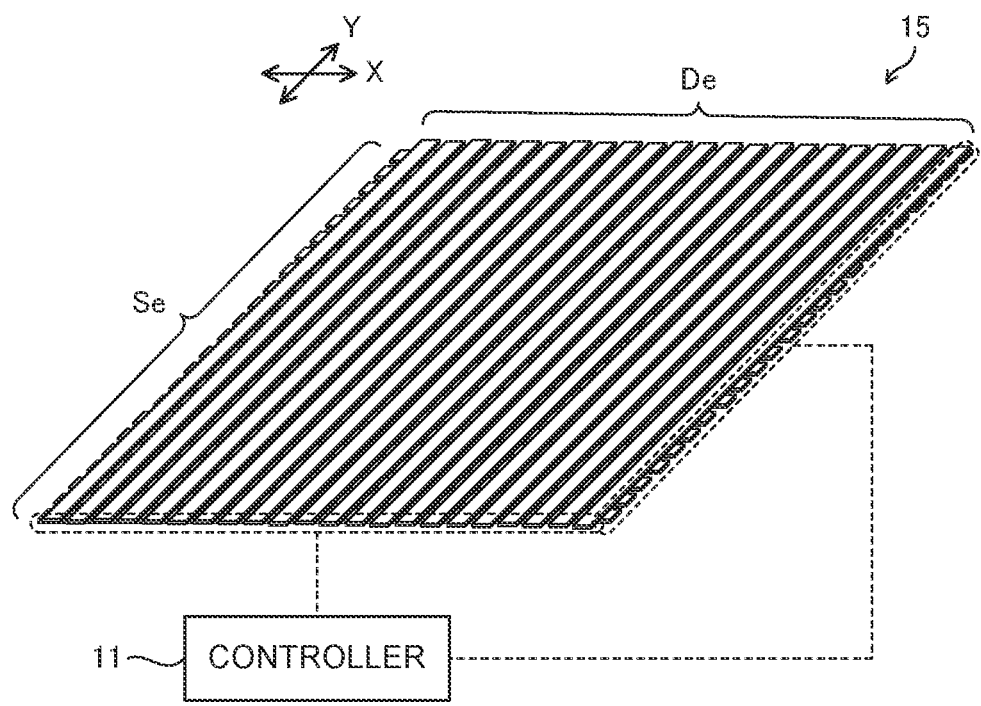
FIG. 4 is a diagram illustrating a configuration of a touch sensor according to the embodiment of the present disclosure.

The touch sensor 15 is, for example, a surface-type or a projection-type capacitive sensor. Note that the touch sensor 15 may be configured by a touch panel superimposed on a surface of the display panel 13. FIG. 4 is a diagram illustrating a configuration of the touch sensor 15. The touch sensor 15 has a plurality of drive electrodes De (driving electrodes) arrayed in an X direction and a plurality of sense electrodes Se (detection electrodes) arranged in a Y direction. The controller 11 inputs drive signals (drive signals) to the drive electrodes De, and the sense electrodes Se output sense signals (detection signals) to the controller 11. The sense signals correspond to capacitance values between the drive electrodes De and the sense electrodes Se. The controller 11 detects an input position on the display screen 13A corresponding to the hover operation based on a change in the capacitance values corresponding to the sense signals.

The storage 12 is a non-volatile storage, such as an HDD (hard disk drive) or an SSD (solid state drive) that stores various types of information. The storage 12 stores a control program, such as an input detection program for causing the controller 11 to execute an input detection process (refer to FIG. 9), which will be described below. For example, the input detection program is recorded in a non-transitory manner in a computer-readable recording medium, such as a CD or a DVD, is read by a reader (not illustrated), such as a CD drive or a DVD drive, provided in the display device 1, and is stored in the storage 12. The input detection program may be distributed from a cloud server to be stored in the storage 12.

The controller 11 includes control devices, such as a CPU, ROM, and RAM. The CPU is a processor that executes various types of calculation processing. The ROM is a non-volatile storage that stores, in advance, control programs of the BIOS, an OS, and the like to cause the CPU to execute the various types of calculation processing. The RAM is a volatile or non-volatile storage that stores various types of information, and is used as temporary storage memory (a workspace) for various processes to be executed ley the CPU. The controller 11 causes the CPU to execute the various control programs, which are stored in the ROM or the storage 12 in advance, to control the display device 1.

Specifically, as illustrated in FIG. 1, the controller 11 includes various processors, such as an input processor 111, a detection processor 112, a display processor 113, a reception processor 114, an execution processor 115, and a change processor 116. Note that the controller 11 functions as the input processor 111, the detection processor 112, the display processor 113, the reception processor 114, the execution processor 115, and the change processor 116, when the CPU executes various processes in accordance with the input detection program. Furthermore, all or some of the processors included in the controller 11 may be configured by an electronic circuit. Note that the display control program may cause a plurality of processor devices to function as the various processors.

The input processor 111 inputs drive signals (driving signals) to the touch sensor 15. Specifically, the input processor 111 inputs drive signals to a drive electrode group Dg (an example of an electrode group in the present disclosure) including the plurality of drive electrodes De. Note that the input processor 111 may boost voltages of the drive signals before inputting the drive signals to the drive electrodes De. This increases the electric lines of force between the drive electrodes De and the sense electrodes Se, and accordingly, an amount of change in capacitance described below is easily detected.

Figure 5:
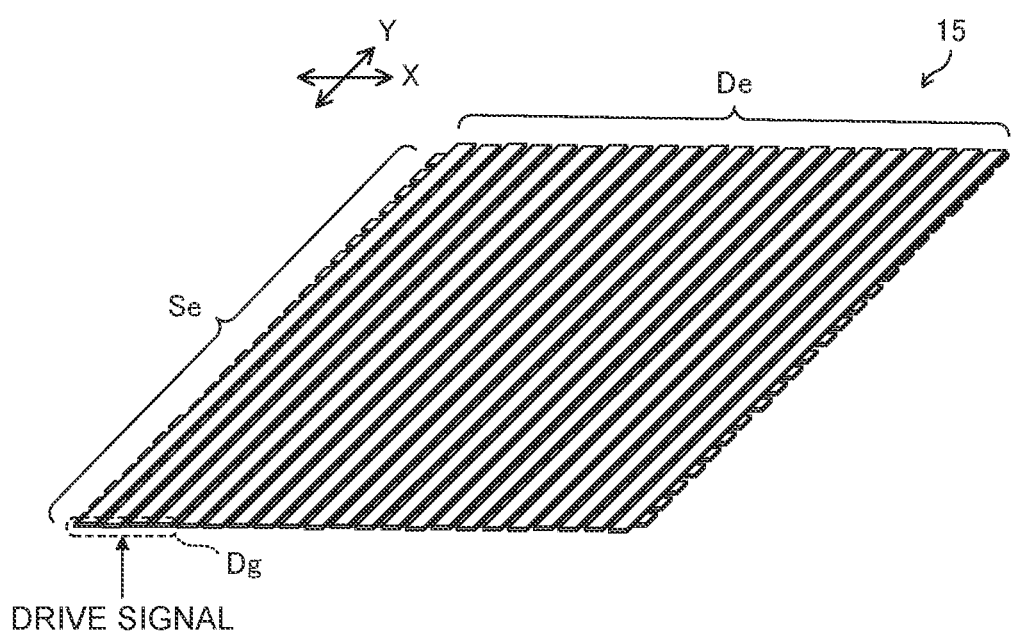
FIG. 5 is a diagram illustrating a configuration of the touch sensor according to the embodiment of the present disclosure.

Specifically, as illustrated in FIG. 5, the input processor 111 inputs a drive signal to a drive electrode group Dg including a number of the drive electrodes De, which are adjacent to each other. Furthermore, the input processor 111 inputs a drive signal (a first drive signal) to a first drive electrode group Dg1 including a number of the drive electrodes De at a first timing, and inputs a drive signal (a second drive signal) to a second drive electrode group Dg2 including a number of the drive electrodes De included in the first drive electrode group Dg1 and at least one of the drive electrodes De that are adjacent to the first drive electrode group Dg1 at a second timing following the first timing.

Figure 6A:
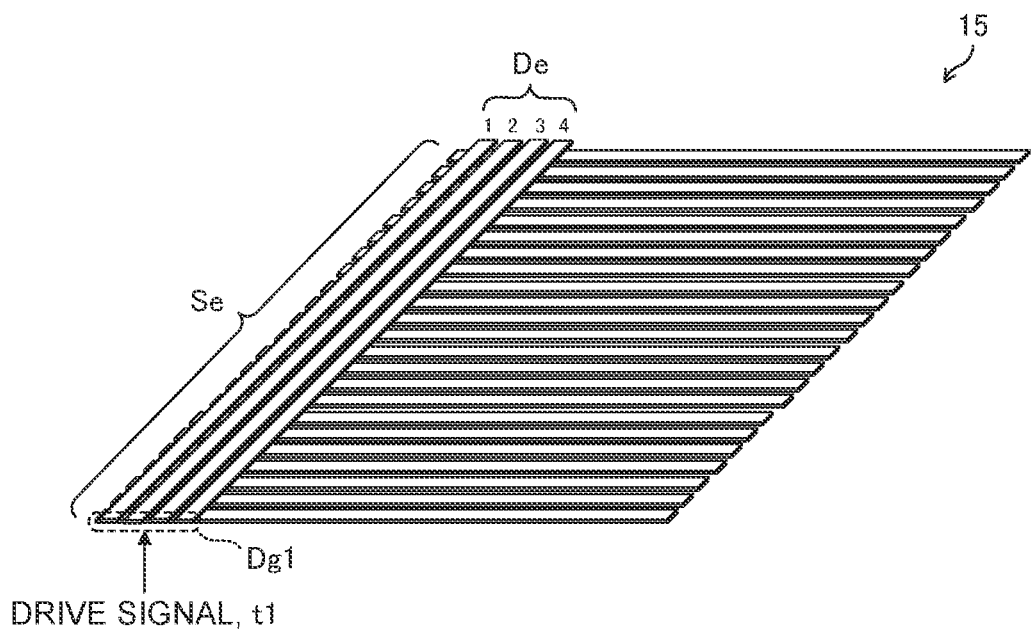
FIG. 6A is a diagram illustrating an example of a method for inputting a signal in the display device according to the embodiment of the present disclosure.
Figure 6B:
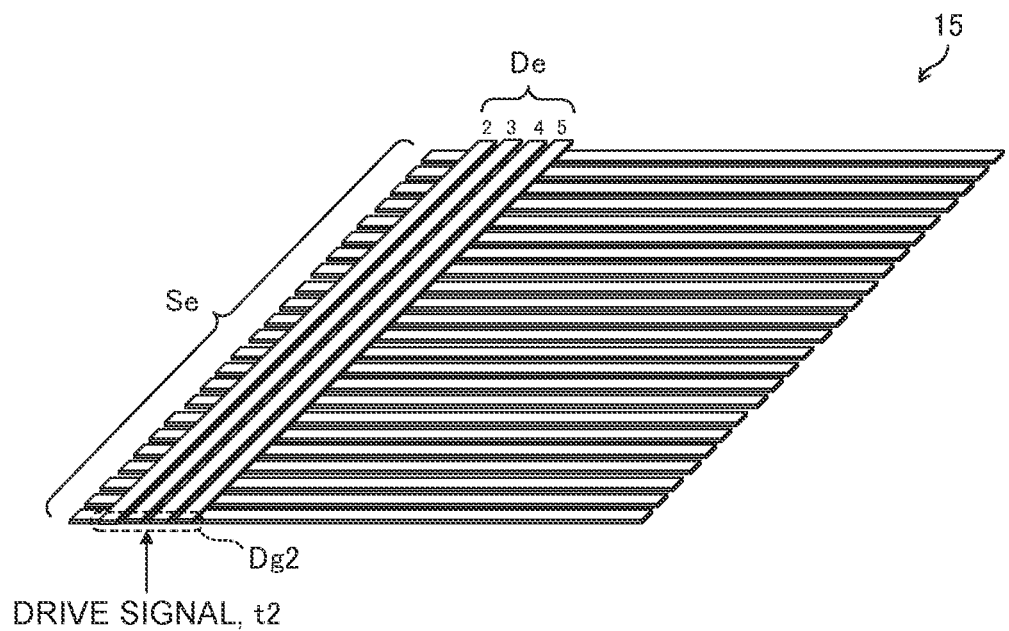
FIG. 6B is a diagram illustrating the example of the method for inputting a signal in the display device according to the embodiment of the present disclosure.
Figure 6C:
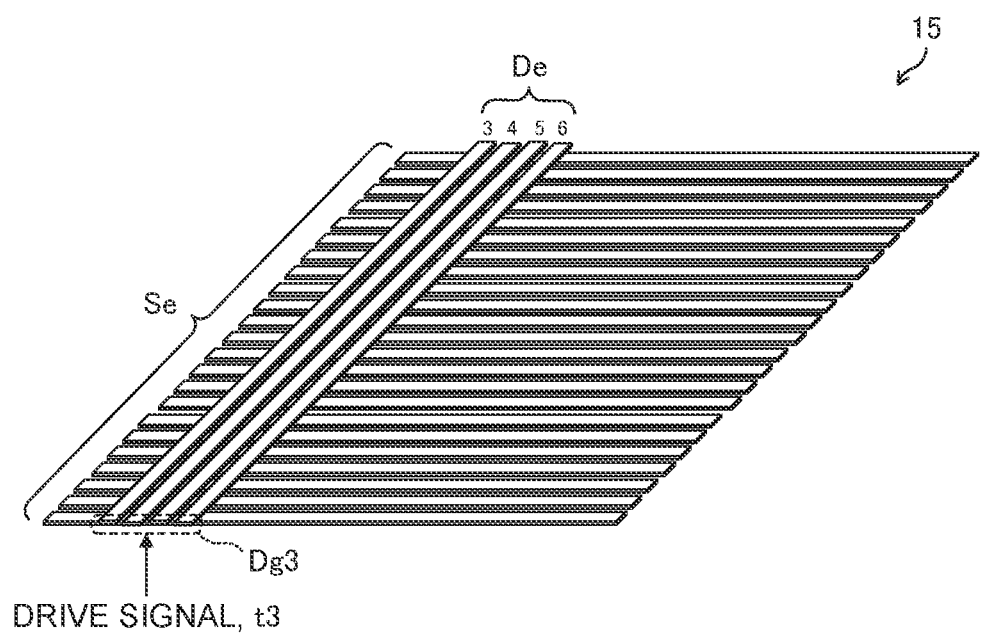
FIG. 6C is a diagram illustrating the example of the method for inputting a signal in the display device according to the embodiment of the present disclosure.

For example, as illustrated in FIGS. 6A to 6C, the input processor 111 inputs a drive signal (a first drive signal) to the first drive electrode group Dg1 including four drive electrodes De, that is, first to fourth drive electrodes De, at a first timing (t1) (refer to FIG. 6A), inputs a drive signal (a second drive signal) to the second drive electrode group Dg2 including four drive electrodes De, that is, second to fifth drive electrodes De, at a second timing (t2) following the first timing (refer to FIG. 6B), and inputs a drive signal (a third drive signal) to a third drive electrode group Dg3 including four drive electrodes De, that is, third to sixth drive electrodes De, at a third timing (t3) following the second timing (refer to FIG. 6C).

Although a case where the drive electrode group Dg includes four drive electrodes De and a drive signal is input to the drive electrode group Dg while shifting the drive electrodes De one by one is illustrated in FIGS. 6A to 6C, the present disclosure is not limited to this as long as two or more drive electrodes De are included in a drive electrode group Dg. Furthermore, the input processor 111 may input a drive signal to the drive electrode group Dg while shifting the drive electrodes De by a plurality of electrodes.

In this way, the input processor 111 inputs a drive signal at different timings while shifting a target range of the drive electrode group Dg for a plurality of drive electrodes De.

The detection processor 112 detects the input position based on a sense signal (an example of a detection signal in the present disclosure) corresponding to a drive signal input to the drive electrode group Dg. For example, the detection processor 112 detects the input position based on a first sense signal corresponding to the drive signal (the first drive signal) for the first drive electrode group Dg1 and a second sense signal corresponding to the drive signal (the second drive signal) for the second drive electrode group Dg2. Specifically, the detection processor 112 detects detection values in accordance with a capacitance generated between the inputter and the display screen 13A. For example, the detection processor 112 receives sense signals output from the sense electrodes Se in accordance with the drive signals input to the drive electrodes De, and detects an amount of change in the capacitance based on the sense signals. The detection processor 112 detects an input position of the input operation (such as a touch operation or a hover operation) based on the amount of change. Note that the detection processor 112 may perform a process of increasing an input gain and a filtering process of removing noise on the received sense signals. The detection processor 112 is an example of a detection processor of the present disclosure.

For example, the detection processor 112 detects the input position based on a plurality of sense signals corresponding to drive signals input to the individual drive electrode groups Dg. Furthermore, the detection processor 112 detects the input position based on a plurality of sense signals corresponding to the individual drive signals input at different timings in a predetermined period of time.

An example of the detection of the input position will now be described with reference to FIGS. 7A to 7E. It is assumed here that the drive electrode group Dg includes eight drive electrodes De, and the input processor 111 inputs a drive signal to each group of eight drive electrodes De. Furthermore, it is assumed here that the user has touched (hovered) near a fifth drive electrode De with a finger.

Figure 7A:
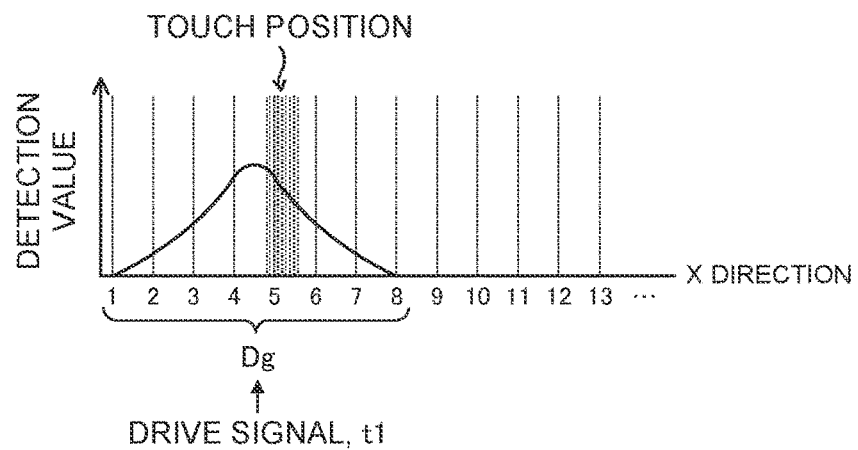
FIG. 7A is a graph illustrating an example of a method for detecting an input position in the display device according to the embodiment of the present disclosure.

At a first timing (t1) illustrated in FIG. 7A, the input processor 111 inputs a drive signal (a first drive signal) to a drive electrode group Dg including eight drive electrodes De, that is, first to eighth drive electrodes De, and the detection processor 112 receives sense signals from individual sense electrodes Se. In FIG. 7A, detection values (an amount of change in capacitance) corresponding to the sense signals at the first timing t1 are illustrated.

Figure 7B:
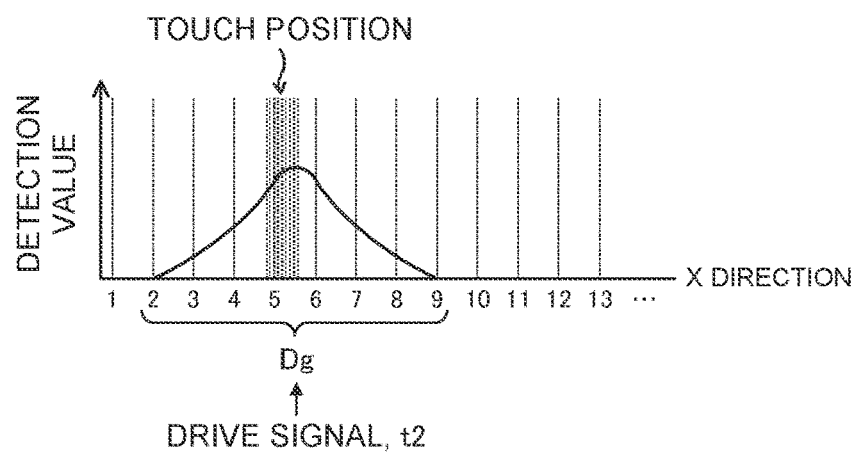
FIG. 7B is a graph illustrating the example of the method for detecting an input position in the display device according to the embodiment of the present disclosure.

At a following second timing (t2) (refer to FIG. 7B), the input processor 111 inputs a drive signal to a drive electrode group Dg including eight drive electrodes De, that is, second to ninth drive electrodes De, and the detection processor 112 receives sense signals from individual sense electrodes Se. In FIG. 7B, detection values (an amount of change in capacitance) corresponding to the sense signals at the first timing t2 are illustrated.

Figure 7C:
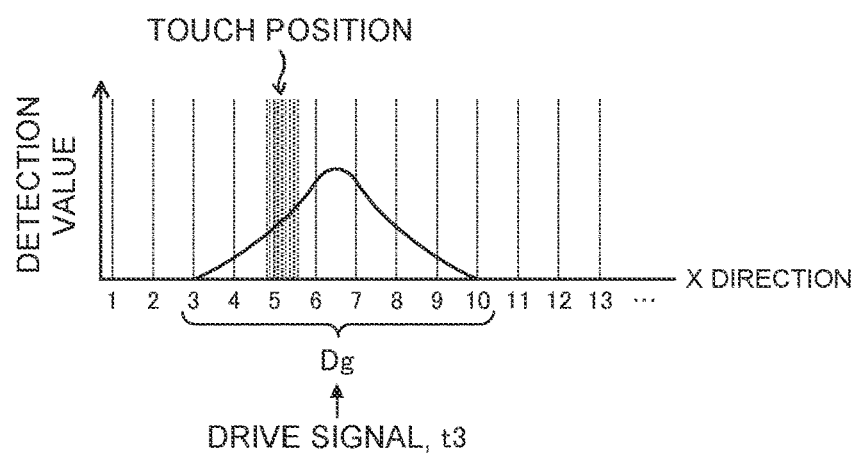
FIG. 7C is a graph illustrating the example of the method for detecting an input position in the display device according to the embodiment of the present disclosure.

At a following third timing (t3) (refer to FIG. 7C), the input processor 111 inputs a drive signal to a drive electrode group Dg including eight drive electrodes De, that is, third to tenth drive electrodes De, and the detection processor 112 receives sense signals from individual sense electrodes Se. In FIG. 7C, detection values (an amount of change in capacitance) corresponding to the sense signals at the third timing t3 are illustrated.

Figure 7D:
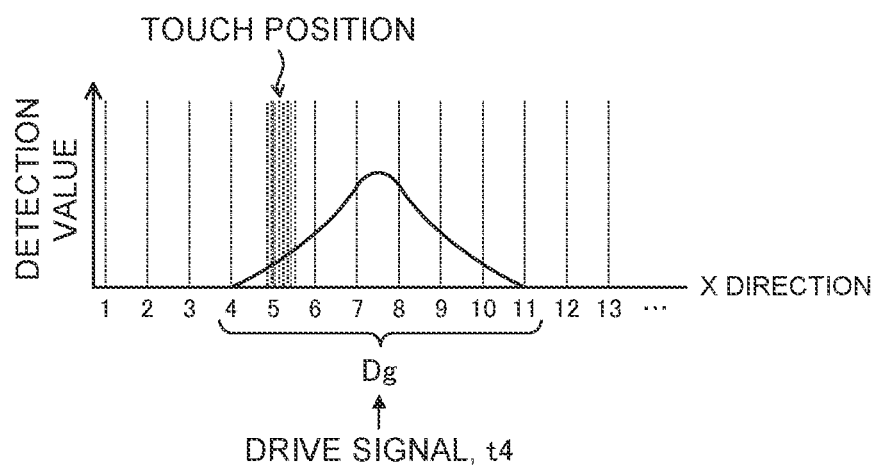
FIG. 7D is a graph illustrating the example of the method for detecting an input position in the display device according to the embodiment of the present disclosure.
Figure 7E:
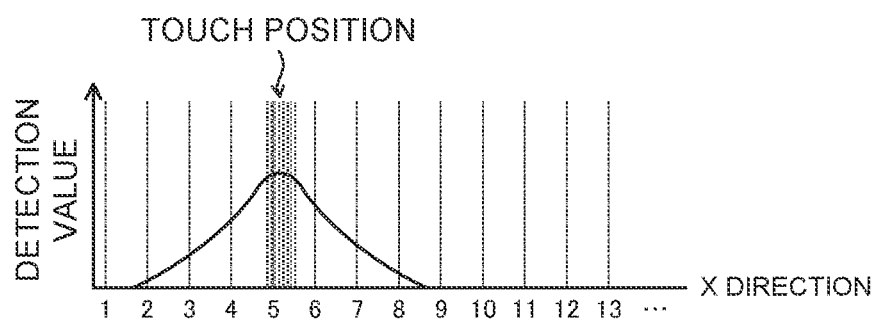
FIG. 7E is a graph illustrating the example of the method for detecting an input position in the display device according to the embodiment of the present disclosure.

At a following fourth timing (t4) (refer to FIG. 7D), the input processor 111 inputs a drive signal to a drive electrode group Dg including eight drive electrodes De, that is, fourth to 11th drive electrodes De, and the detection processor 112 receives sense signals from individual sense electrodes Se. In FIG. 7D, detection values (an amount of change in capacitance) corresponding to the sense signals at the fourth timing t4 are illustrated.

In this way, the input processor 111 inputs a drive signal at the different timings while shifting a target range of the drive electrode group Dg for the plurality of drive electrodes De, and the detection processor 112 receives sense signals from the individual sense electrodes Se.

Then the detection processor 112 detects the input position based on an average of the detection values corresponding to the plurality of sense signals included in the predetermined period of time. Then the detection processor 112 detects the input position based on the average (refer to FIG. 7E) of the detection values of the plurality of sense signals received in a period from t1 to t4.

Figure 8:
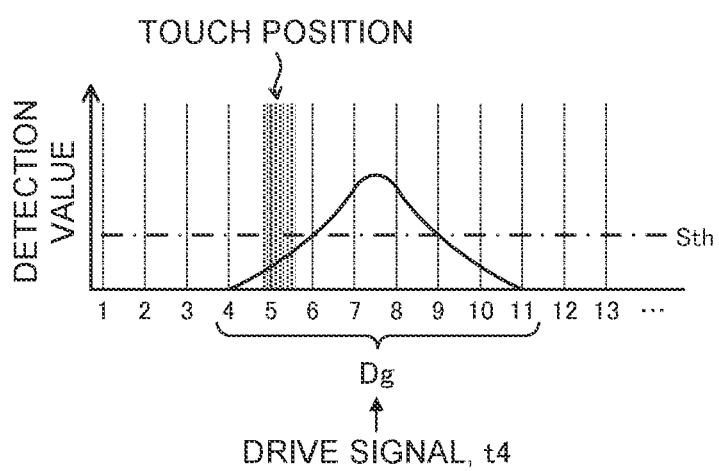
FIG. 8 is a graph illustrating the example of the method for detecting an input position in the display device according to the embodiment of the present disclosure.

Furthermore, the detection processor 112 may detect the input position based on a specific sense signal having a detection value equal to or larger than a threshold among the plurality of sense signals included in the predetermined period of time. For example, as shown in FIG. 8, when the amount of change in capacitance corresponding to a sense signal is smaller than a threshold Sth, the detection processor 112 excludes the sense signal and detects the input position based on the other sense signals.

Thus, the input processor 111 inputs drive signals to the plurality of drive electrodes De in the drive electrode group Dg at the same timing, and in addition, inputs drive signals to the individual drive electrodes De a number of times while shifting a position of the drive electrode group Dg.

The display processor 113 displays the input operation icon P1 on the display screen 13A. For example, the display processor 113 displays, on the display screen 13A, the input operation icon P1 (refer to FIG. 2) in the input position detected by the detection processor 112.

The reception processor 114 receives a movement operation to move the input operation icon P1 and a selection operation to select a selection target by the input operation icon P1. The reception processor 114 receives the movement operation and the selection operation in response to a movement of a user's finger.

The execution processor 115 executes an input process corresponding to an input operation received by the reception processor 114. Specifically, when the movement operation or the selection operation is received, the execution processor 115 performs an input process corresponding to an input operation performed by the user on the display screen 13A. For example, when the reception processor 114 receives the movement operation, the execution processor 115 moves the input operation icon P1 on the display screen 13A. For example, when the reception processor 114 receives the selection operation, the execution processor 115 performs a process corresponding to a selected target on the display screen 13A. The execution processor 115 is an example of an execution processor according to the present disclosure.

Input Detection Process

Figure 9:
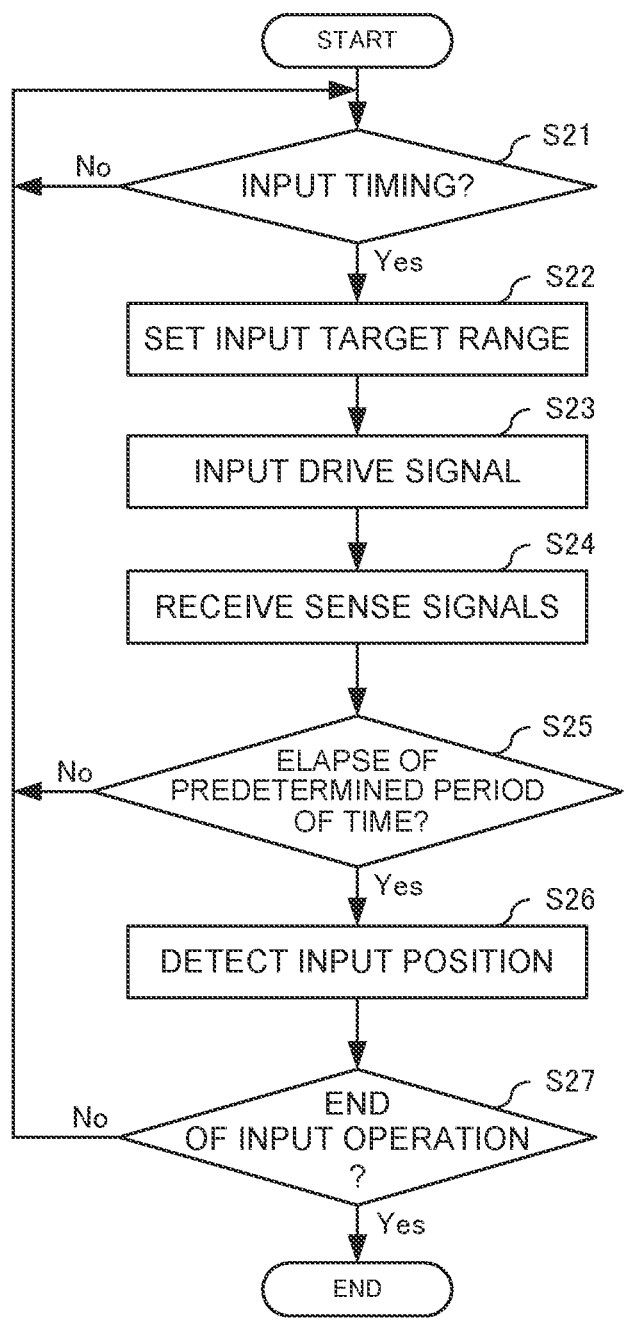
FIG. 9 is a flowchart of an example of a procedure of an input detection process executed in the display device according to the embodiment of the present disclosure.

Hereinafter, the input detection process executed by the controller 11 of the display device 1 will be described with reference to FIG. 9.

Note that the present disclosure can be regarded as a disclosure of an input detection method (an example of an input detection method in the present disclosure) for executing one or more steps included in the input detection process, and one or more steps included in the input detection process described herein may be omitted as appropriate. Note that the steps of the input detection process may be executed in a different order as long as the similar function effect is obtained. Furthermore, a description will be made herein on a case where the controller 11 executes the steps in the input detection process as an example. However, an input detection method executed in such a manner that a plurality of processors execute the steps in the input detection process in a distributed manner is also regarded as another embodiment.

First, in step S21, the controller 11 determines whether the timing to input a drive signal has arrived. The timing (a cycle) for inputting a drive signal is set in advance. When the timing to input the drive signal has arrived (S21: Yes), the controller 11 proceeds to step S22. The controller 11 waits until the timing to input a drive signal has arrived (S21: No).

Next, in step S22, the controller 11 sets a target range of the drive electrode group Dg to which a drive signal is to be input. For example, as illustrated in FIG. 7A, the controller 11 sets a drive electrode group Dg including first to eighth drive electrodes De as the target range.

Subsequently, in step S23, the controller 11 inputs a drive signal to the drive electrode group Dg in the set target range. For example, as illustrated in FIG. 7A, the controller 11 inputs a drive signal to the drive electrode group Dg including the first to eighth drive electrodes De at the timing t1.

Thereafter, in step S24, the controller 11 receives sense signals from individual sense electrodes Se.

In step S25, the controller 11 determines whether a predetermined period of time has elapsed. As the predetermined period of time, a period of time in which sense signals corresponding to the same drive electrode De are consecutively received a plurality of times, for example, is set. When determining that the predetermined period of time has elapsed (S25: Yes), the controller 11 proceeds to step S26. On the other hand, when determining that the predetermined period of time has not elapsed (S25: No), the controller 11 returns to step S21.

Returning to step S21, when the next timing t2 has arrived, the controller 11 sets a drive electrode group Dg including second to ninth drive electrodes De as the target range (S22) and inputs a drive signal to the drive electrode group Dg (S23). Then the controller 11 receives sense signals from the individual sense electrodes Se (S24).

The controller 11 repeatedly performs the process from step S21 to step S24 until the predetermined period of time has elapsed (refer to FIGS. 7B to 7D).

When the predetermined period of time has elapsed (S25: Yes), the controller 11 detects an input position in step S26. Specifically, the controller 11 detects the input position based on an average of detection values corresponding to the plurality of sense signals included in the predetermined period of time. In the example described above, the controller 11 detects the input position based on the average (refer to FIG. 7E) of the detection values of the plurality of sense signals received in the period from t1 to t4.

Subsequently, in step S27, the controller 11 determines whether the input operation has been terminated. When the user terminates the input operation performed on the display screen 13A, the controller 11 determines that, the input operation has been terminated (S27: Yes), and terminates the display control process. On the other hand, when the user continues the input operation on the display screen 13A, the controller 11 determines that the input operation has not been terminated (S27: No), and returns to step S21. The controller 11 thus executes the input detection process.

As described above, the display device 1 of this embodiment inputs drive signals to the drive electrode group Dg including a number of the drive electrodes De, which are arranged adjacent to each other, and detects an input position based on sensor signals corresponding to the drive signals input to the drive electrode group Dg. Furthermore, the display device 1 inputs a first drive signal to a first drive electrode group Dg1 including a number of the drive electrodes De at a first timing, inputs a second drive signal to a second drive electrode group Dg2 including a number of the drive electrodes De included in the first drive electrode group Dg1 and at least one of the drive electrodes De that are adjacent to the first drive electrode group Dg1 at a second timing following the first timing, and detects the input position based on a first sense signal corresponding to the first drive signal and a second sense signal corresponding to the second drive signal.

According to the configuration described above, the electric lines of force between the drive electrodes De and the sense electrodes Se can be increased by inputting a drive signal to a drive electrode group Dg, which is a bundle of a plurality of drive electrodes De, and accordingly, detection sensitivity for a hover operation can be improved. Furthermore, since a drive signal is input to each drive electrode De a plurality of time, a resolution equivalent to a configuration in which drive signals are input to drive electrodes De one by one can be obtained. Thus, the detection sensitivity for the input operation on the display panel 13 can be improved, as well as the detection accuracy for the input position.

As another embodiment, the input processor 111 may input, in a first mode in which a contactless input operation (a hover operation) performed by the inputter on the display panel 13 is received, drive signals to the individual drive electrodes De included in the drive electrode group Dg at the same timing and may input, in a second mode in which a contact input operation (a touch operation) performed by the inputter on the display panel 13 is received, drive signals to the different drive electrodes at different timings.

Furthermore, the input processor 111 may set the first mode in a state in which the inputter is not in contact with the display screen 13A (a contactless state), and may set the second mode when the inputter is in contact with the display screen 13A.

Method for Displaying Input Operation Icon

Another method for displaying the input operation icon P1 will be described.

Specifically, the display processor 113 displays the input operation icon P1 on the display screen 13A in a first display form when the detection value detected by the detection processor 112 is equal to or larger than a first threshold, and displays the input operation icon P1 on the display screen 13A in a second display form when the detection value detected by the detection processor 112 is equal to or larger than a second threshold.

Figure 10:
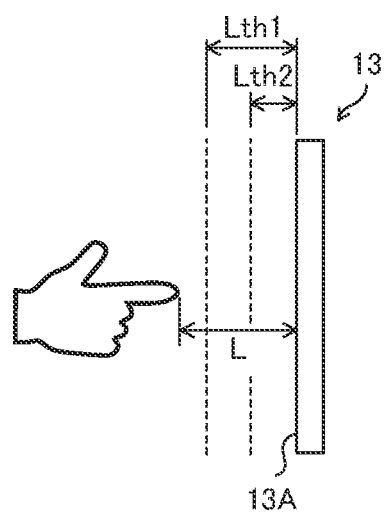
FIG. 10 is a diagram schematically illustrating an example of a hover operation in the display device according to the embodiment of the present disclosure.

For example, as illustrated in FIG. 10, when a distance L between a finger of the user and the display screen 13A is larger than a predetermined distance Lth1, an amount of change in the capacitance detected by the detection processor 112 is smaller than the first threshold, and therefore, the display processor 113 does not display the input operation icon P1 on the display screen 13A.

Figure 11A:
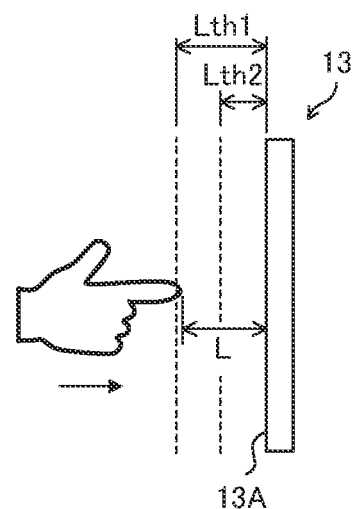
FIG. 11A is a diagram schematically illustrating an example of a hover operation in the display device according to the embodiment of the present disclosure.
Figure 11B:
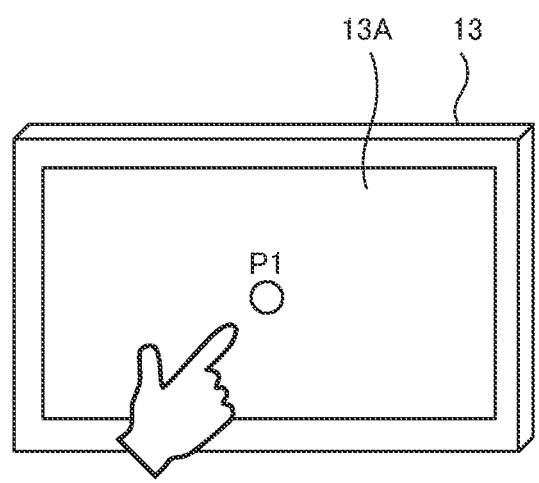
FIG. 11B is a diagram illustrating an example of a display screen according to the embodiment of the present disclosure.

On the other hand, as illustrated in FIG. 11A, for example, when the finger of the user approaches the display screen 13A and the distance L between the finger and the display screen 13A becomes equal to or smaller than the predetermined distance Lth1, an amount of change in capacitance detected by the detection processor 112 becomes equal to or larger than the first threshold. In this case, as illustrated in FIG. 11B, the display processor 113 displays the input operation icon P1 on the display screen 13A in the first display form (an outer edge of a circle is displayed in black and an inside of the circle is displayed in white).

Figure 12A:
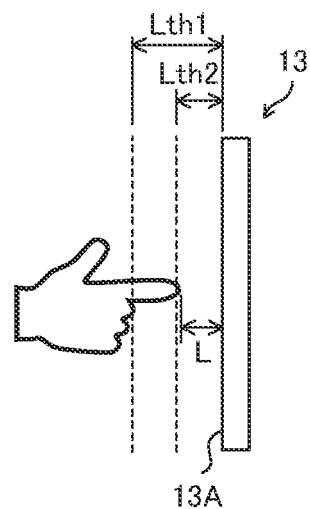
FIG. 12A is a diagram schematically illustrating an example of a hover operation in the display device according to the embodiment of the present disclosure.
Figure 12B:
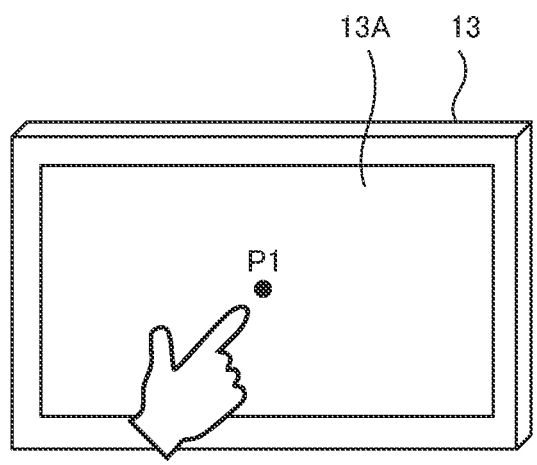
FIG. 12B is a diagram illustrating an example of a display screen according to the embodiment of the present disclosure.

On the other hand, as illustrated in FIG. 12A, for example, when the finger of the user further approaches the display screen 13A and the distance L between the finger and the display screen 13A becomes equal to or smaller than a predetermined distance Lth2, an amount of change in capacitance detected by the detection processor 112 becomes equal to or larger than the second threshold. In this case, as illustrated in FIG. 12B, the display processor 113 displays the input operation icon P1 on the display screen 13A in the second display form (an outer edge of a circle and an inside of the circle are displayed in black).

The reception processor 114 receives a movement operation of moving the input operation icon P1 when the detection value detected by the detection processor 112 is equal to or larger than the first threshold and smaller than the second threshold. Specifically, as illustrated in FIG. 12A, when the distance L between the finger of the user and the display screen 13A is equal to or smaller than the predetermined distance Lth1 and equal to or larger than the predetermined distance Lth2 and when an amount of change in capacitance is equal to or larger than the first threshold and smaller than the second threshold, the reception processor 114 receives the movement operation of moving the input operation icon P1.

The reception processor 114 receives a selection operation of selecting a target using the input operation icon P1 when the detection value detected by the detection processor 112 is equal to or larger than the second threshold. Specifically, as illustrated in FIG. 12A, when the distance L between the finger of the user and the display screen 13A is equal to or smaller than the predetermined distance Lth2 and when an amount of change in capacitance is equal to or larger than the second threshold, the reception processor 114 receives the selection operation of selecting a target using the input operation icon P1. The reception processor 114 is an example of a reception processor according to the present disclosure.

The execution processor 115 executes an input process corresponding to an input operation received by the reception processor 114. Specifically, when the movement operation or the selection operation is received, the execution processor 115 performs an input, process corresponding to an input operation performed by the user on the display screen 13A. For example, when the reception processor 114 receives the movement operation, the execution processor 115 moves the input operation icon P1 on the display screen 13A. For example, when the reception processor 114 receives the selection operation, the execution processor 115 performs a process corresponding to a selected target on the display screen 13A. The execution processor 115 is an example of an execution processor according to the present disclosure.

The change processor 116 changes a display form of the input operation icon P1 based on the detection value detected by the detection processor 112. Specifically, the change processor 116 changes a display form of the input operation icon P1 between the first display form and the second display form in accordance with the detection value step by step or continuously, when the detection value detected by the detection processor 112 is equal to or larger than the first threshold and smaller than the second threshold. The change processor 116 is an example of a change processor according to the present disclosure.

Figure 13:
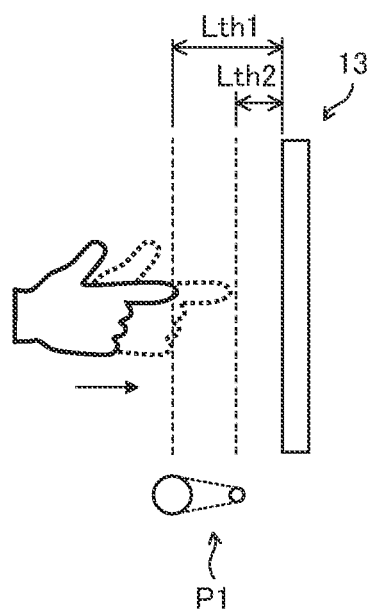
FIG. 13 is a diagram schematically illustrating an example of a hover operation in the display device according to the embodiment of the present disclosure.

For example, as illustrated in FIG. 13, the change processor 116 reduces a size of the input operation icon P1 step by step or continuously as the finger of the user approaches the display screen 13A. As another embodiment, the change processor 116 may change a shape, a color, brightness, or tone of the input operation icon P1 step by step or continuously as the finger of the user approaches the display screen 13A.

As a further embodiment, the controller 11 may output first sound when the detection value detected by the detection processor 112 is equal to or larger than the first threshold, output second sound when the detection value is equal to or larger than the second threshold, and change a volume of the sound in accordance with the detection value when the detection value is equal to or larger than the first threshold and smaller than the second threshold.

Display Control Process

Figure 14:
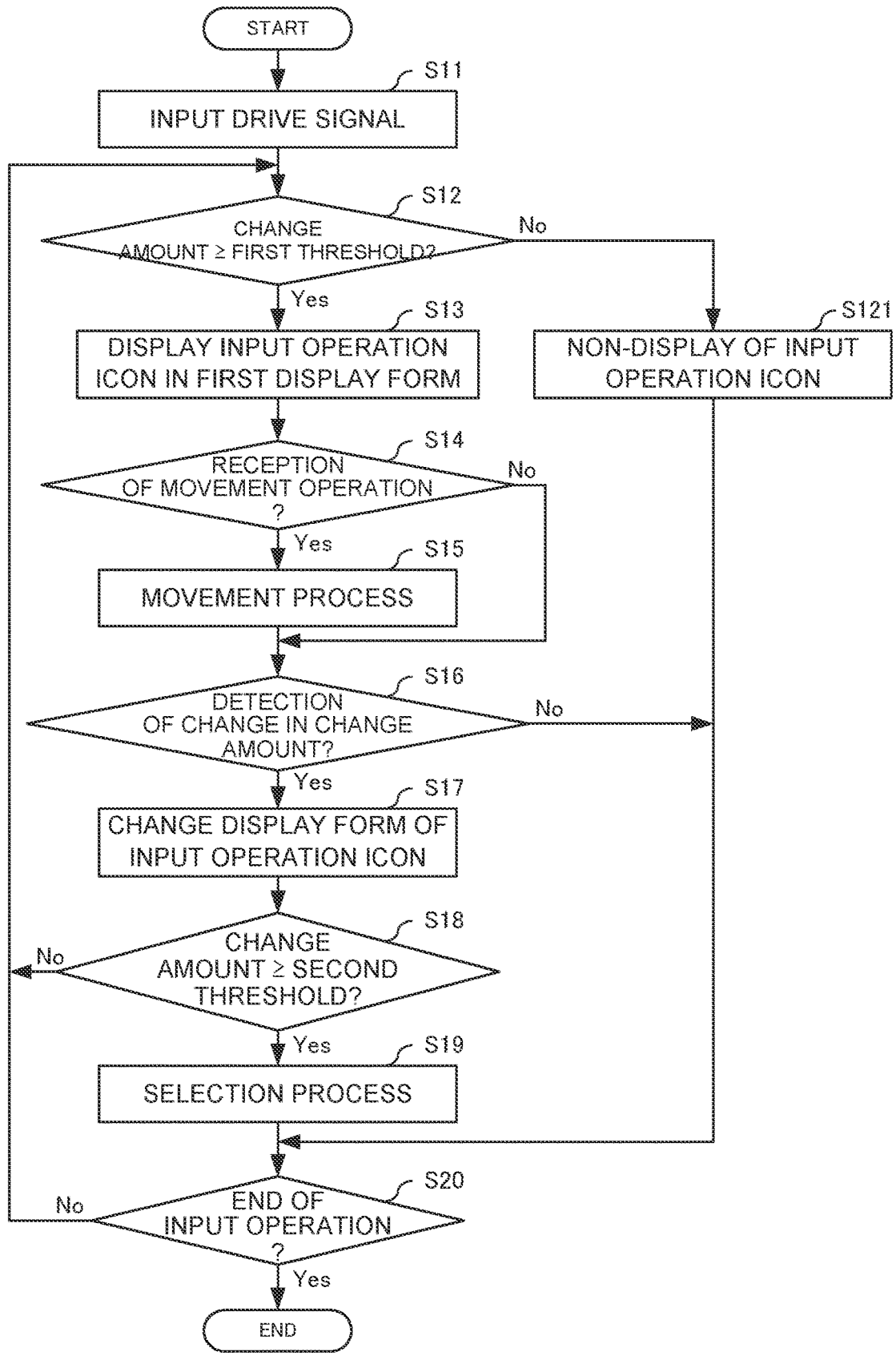
FIG. 14 is a flowchart of an example of a procedure of a display control process executed in the display device according to the embodiment of the present disclosure.

A description will be made hereinafter on the display control process that is executed by the controller 11 of the display device 1 with reference to FIG. 14.

First, in step S11, the controller 11 inputs drive signals (driving signals) to the touch sensor 15. Specifically, the controller 11 inputs drive signals to the drive electrodes De.

The controller 11 continues the process of inputting drive signals at a predetermined cycle until an input operation of the user is terminated.

Next, in step S12, the controller 11 detects a detection value (an amount of change) in accordance with capacitance generated between the inputter (the finger of the user in this embodiment) and the display screen 13A, and determines whether the amount of change is equal to or larger than the first threshold. When determining that the amount of change is equal to or larger than the first threshold (S12: Yes), the controller 11 proceeds to step S13. On the other hand, when determining that the amount of change is smaller than the first threshold (S12: No), the controller 11 proceeds to step S121.

In step S13, the controller 11 displays the input operation icon P1 in the first display form on the display screen 13A. For example, as illustrated in FIG. 11A, for example, when the finger of the user approaches the display screen 13A and the distance L between the finger and the display screen 13A becomes equal to or smaller than the predetermined distance Lth1, the amount of change becomes equal to or larger than the first threshold. In this case, as illustrated in FIG. 11B, the controller 11 displays the input operation icon P1 on the display screen 13A in the first display form (an outer edge of a circle is displayed in black and an inside of the circle is displayed in white).

Subsequently, in step S14, the controller 11 determines whether a movement operation of the input operation icon P1 has been received. For example, when the amount of change is within a predetermined range and a detection position (an X coordinate and a Y coordinate) of the detection value is changed, the controller 11 determines that the movement operation of the input operation icon P1 has been received. After receiving the movement operation of the input operation icon P1 (S14:Yes), the controller 11 proceeds to step S15. On the other hand, when the movement operation of the input operation icon P1 has not been received (S14:No), the controller 11 proceeds to step S16.

In step S15, the controller 11 moves the position of the input operation icon P1 displayed on the display screen 13A in accordance with the movement operation.

Next, in step S16, the controller 11 determines whether the amount of change based on the capacitance has been changed. When determining that the amount of change has been changed (S16: Yes), the controller 11 proceeds to step S17. On the other hand, when determining that the amount of change has not been changed (S16: No), the controller 11 proceeds to step S20.

In step S17, the controller 11 changes the display form of the input operation icon P1 displayed on the display screen 13A. Specifically, the controller 11 changes the display form of the input operation icon P1 in accordance with the amount of change.

For example, as illustrated in FIG. 13, the controller 11 reduces the size of the input operation icon P1 step by step or continuously as the finger of the user approaches the display screen 13A. As another embodiment, the controller 11 may change a shape, a color, brightness, or tone of the input operation icon P1 step by step or continuously as the finger of the user approaches the display screen 13A.

Subsequently, in step S18, the controller 11 determines whether the amount of change is equal to or larger than the second threshold. When determining that the amount of change is equal to or larger than the second threshold (S18: Yes), the controller 11 proceeds to step S19. On the other hand, when determining that the amount of change is smaller than the second threshold (S18: No), the controller 11 returns to step S12.

Here, returning to step S12, when the amount of change is smaller than the first threshold (S12: No) (refer to FIG. 10), the controller 11 proceeds to step S121 to delete the input operation icon P1 from the display screen 13A. In the state of FIG. 11A, for example, when the user moves the finger away from the display screen 13A, and therefore, the distance L between the finger and the display screen 13A becomes larger than the predetermined distance Lth1 (refer to FIG. 10), the controller 11 brings the input operation icon P1 into a non-display state.

In step S19, the controller 11 receives an operation of selecting a target on the display screen 13A and executes a process corresponding to the selected target.

Subsequently, in step S20, the controller 11 determines whether the input operation has been terminated. When the user terminates the input operation on the display screen 13A, the controller 11 determines that the input operation has been terminated (S20: Yes), and terminates the display control process. On the other hand, when the user continues the input operation on the display screen 13A, the controller 11 determines that the input operation has not been terminated (S20: No), and returns to step S12. The controller 11 thus executes the display control process.

As described above, the display device 1 of this embodiment detects a detection value in accordance with capacitance generated between the inputter and the display screen 13A, and displays, when the detection value is equal to or larger than the first threshold, the input operation icon P1 on the display screen 13A in the first display form, and displays, when the detection value is equal to or larger than the second threshold, the input operation icon P1 on the display screen 13A in the second display form. Furthermore, the display device 1 receives a selection operation of selecting a target using the input operation icon P1 when the detection value is equal to or larger than the second threshold.

According to the above configuration, when a finger of the user approaches the display screen 13A to perform a hover operation, the input operation icon P1 is displayed on the display screen 13A in the first display form, and when the finger further approaches the display screen 13A, the input operation icon P1 is displayed on the display screen 13A in the second display form which enables the selection operation. Accordingly, the user can easily recognize a distance between the finger and the display screen 13A that enables reception of the selection operation, and therefore, operability of the hover operation can be improved.

The display device 1 that executes the display control process can be configured as follows.

Appendix 1

A capacitive display device that receives a contactless input operation performed by an inputter on a display screen, the display device comprising:
a detection processor that detects a detection value corresponding to a capacitance generated between the inputter and the display screen;
a display processor that displays an input operation icon in a first display form on the display screen when the detection value detected by the detection processor is equal to or larger than a first threshold and displays the input operation icon in a second display form on the display screen when the detection value detected by the detection processor is equal to or larger than a second threshold; and
a reception processor that receives an operation of selecting a target using the input operation icon when the detection value detected by the detection processor is equal to or larger than the second threshold.

Appendix 2

The display device according to Appendix 1, further comprising a change processor that changes a display form of the input operation icon, step by step or continuously, between the first display form and the second display form in accordance with the detection value detected ley the detection processor, when the detection value is equal to or larger than the first threshold and smaller than the second threshold.

Appendix 3

The display device according to Appendix 2, wherein the change processor changes a size of the input operation icon, step by step or continuously, between the first display form and the second display form.

Appendix 4

The display device according to Appendix 2 or Appendix 3, wherein the change processor changes a color of the input operation icon, step by step or continuously, between the first display form and the second display form.

Appendix 5

The display device according to any one of Appendix 2 to Appendix 4, wherein the change processor changes a shape of the input operation icon, step by step or continuously, between the first display form and the second display form.

Appendix 6

The display device according to any one of Appendix 1 to Appendix 5, wherein the reception processor receives an operation of moving the input operation icon, when the detection value detected by the detection processor is equal to or larger than the first threshold and smaller than the second threshold.

Appendix 7

The display device according to any one of Appendix 1 to Appendix 6, further comprising an execution processor that executes an input process corresponding to the input operation performed by the inputter on the display screen, when the reception processor receives the movement operation or the selection operation.

Appendix 8

A capacitive display method that receives a contactless input operation performed by an inputter on a display screen, the display method causing
at least one processor to execute:
a detection step of detecting a detection value corresponding to a capacitance generated between the inputter and the display screen;
a display step of displaying an input operation icon in a first display form on the display screen when the detection value detected in the detection step is equal to or larger than a first threshold and displaying the input operation icon in a second display form on the display screen when the detection value detected in the detection step is equal to or larger than a second threshold; and
a reception step of receiving an operation of selecting a target using the input operation icon when the detection value detected in the detection step is equal to or larger than the second threshold.

Appendix 9

A capacitive display program that receives a contactless input operation performed by an inputter on a display screen, the display program causing
at least one processor to execute:
a detection step of detecting a detection value corresponding to a capacitance generated between the inputter and the display screen;
a display step of displaying an input operation icon in a first display form on the display screen when the detection value detected in the detection step is equal to or larger than a first threshold and displaying the input operation icon in a second display form on the display screen when the detection value detected in the detection step is equal to or larger than a second threshold; and
a reception step of receiving an operation of selecting a target using the input operation icon when the detection value detected in the detection step is equal to or larger than the second threshold.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An input detection device that detects an input position of an inputter on a display panel, the input detection device comprising:
    an input circuit that inputs a drive signal to an electrode group including a number of electrodes that are arranged adjacent to each other among a plurality of electrodes arranged in parallel on the display panel; and
    a detection circuit that detects the input position based on a detection signal corresponding to the drive signal input to the electrode group, wherein
    the input circuit inputs a first drive signal to a first electrode group including a plurality of electrodes at a first timing and inputs, at a second timing subsequent to the first timing, a second drive signal to a second electrode group including a number of the electrodes included in the first electrode group and at least one electrode positioned adjacent to the first electrode group, and
    the detection circuit detects the input position based on a first detection signal corresponding to the first drive signal and a second detection signal corresponding to the second drive signal.

2. The input detection device according to claim 1, wherein the input circuit inputs the drive signals at different timings while shifting a target range of the electrode group for the plurality of electrodes arranged in parallel on the spray panel.

3. The input detection device according to claim 2, wherein the detection circuit detects the input position based on the plurality of detection signals corresponding to the plurality of drive signals input at the different timings in a predetermined period of time.

4. The input detection device according to claim 3, wherein the detection circuit detects the input position based on an average of the detection values corresponding to the plurality of detection signals included in the predetermined period of time.

5. The input detection device according to claim 3, wherein the detection circuit detects the input position based on a specific detection signal having a detection value equal to or larger than a threshold among the plurality of detection signals included in the predetermined period of time.

6. The input detection device according to claim 1, wherein
    the input circuit
        inputs the drive signals respectively to the plurality of electrodes included in the electrode group at the same timing in a first mode in which a contactless input operation performed by the inputter on the display panel is received, and
        inputs the drive signals to the different electrodes at respectively different timings in a second mode in which a contact input operation performed by the inputter on the display panel is received.

7. An input detection method for detecting an input position of an inputter on a display panel, the input detection method causing
    at least one processor to execute:
        inputting a drive signal to an electrode group including a number of electrodes that are arranged adjacent to each other among a plurality of electrodes arranged in parallel on the display panel;
        detecting the input position based on a detection signal corresponding to the drive signal input to the electrode group;
        inputting a first drive signal to a first electrode group including a plurality of electrodes at a first timing, and inputting a second drive signal to a second electrode group including a number of the electrodes included in the first electrode group and at least one electrode that is adjacent to the first electrode group at a second timing following the first timing; and
        detecting the input position based on a first detection signal corresponding to the first drive signal and a second detection signal corresponding to the second drive signal.

8. A non-transitory computer-readable recording medium recording an input detection program for detecting an input position of an inputter on a display panel, the input detection program causing
    at least one processor to execute:
        inputting a drive signal to an electrode group including a number of electrodes that are arranged adjacent to each other among a plurality of electrodes arranged in parallel on the display panel;
        detecting the input position based on a detection signal corresponding to the drive signal input to the electrode group;
        inputting a first drive signal to a first electrode group including a plurality of electrodes at a first timing, and inputting a second drive signal to a second electrode group including a number of the electrodes included in the first electrode group and at least one electrode that is adjacent to the first electrode group at a second timing following the first timing; and
        detecting the input position based on a first detection signal corresponding to the first drive signal and a second detection signal corresponding to the second drive signal.

* * * * *